(12) United States Patent
Edwards et al.

(10) Patent No.: US 10,805,674 B2
(45) Date of Patent: Oct. 13, 2020

(54) CONTENT AGGREGATION AND DISTRIBUTION FOR REAL-TIME AND NON-REAL-TIME PRODUCTION

(71) Applicant: Disney Enterprises, Inc., Burbank, CA (US)

(72) Inventors: Jon M. Edwards, Anaheim, CA (US); Michael J. Strein, Bohemia, NY (US); Bradley C. Wall, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/162,209

(22) Filed: Oct. 16, 2018

(65) Prior Publication Data
US 2020/0120383 A1 Apr. 16, 2020

(51) Int. Cl.
*H04N 21/44* (2011.01)
*H04N 21/45* (2011.01)
*H04N 21/81* (2011.01)
*H04N 21/4402* (2011.01)

(52) U.S. Cl.
CPC ... *H04N 21/44016* (2013.01); *H04N 21/4402* (2013.01); *H04N 21/4524* (2013.01); *H04N 21/8126* (2013.01)

(58) Field of Classification Search
None
See application file for complete search history.

(56) References Cited

U.S. PATENT DOCUMENTS

| 7,039,933 | B1* | 5/2006 | Chen | H04N 21/2221 |
| | | | | 375/E7.004 |
| 2003/0172381 | A1* | 9/2003 | Janevski | H04N 7/163 |
| | | | | 725/46 |
| 2006/0259612 | A1* | 11/2006 | De Oliveira | H04L 41/0226 |
| | | | | 709/224 |

(Continued)

OTHER PUBLICATIONS

Society of Cable Telecommunications Engineers Standards, "ANSI/SCTE 224, 2018r1 Event Scheduling and Notification Interface (ESNI),", 25 Pages.

(Continued)

*Primary Examiner* — James R Marandi
(74) *Attorney, Agent, or Firm* — Patterson + Sheridan, LLP

(57) ABSTRACT

Systems, methods, and articles of manufacture for content aggregation and distribution for real-time and non-real-time production of video content items may be realized by receiving, at a first device from a second device, an annotated video stream that includes principal material in a principal spectrum (which is in-band for output on a display device) and supplemental material in a supplemental spectrum (which is out-of-band for the display device) and in response to receiving, from the downstream device, an indication that the principal material is of secondary interest and that the supplemental material is of primary interest: repackaging the annotated video stream to include the supplemental material in the principal spectrum via insertion, substitution, or splicing. The content may be repackaged in real-time with linear delivery, and in non-real-time with on-demand delivery, and various entities may add content for later inclusion, and adjust which content is transmitted to downstream entities.

20 Claims, 5 Drawing Sheets

(56) References Cited

U.S. PATENT DOCUMENTS

2017/0085953 A1* 3/2017 Pruden .......... H04N 21/440281

OTHER PUBLICATIONS

Society of Cable Telecommunications Engineers Standards, ANSI/ SCTE 104 2017, Automation System to Compression System Communications Applications Program Interface (API), 120 pages.
Society of Cable Telecommunications Engineers Standards, ANSI/ SCTE 35 2017, Digital Program Insertion Cueing Message for Cable, 175 pages.

* cited by examiner

CONTENT AGGREGATION AND DISTRIBUTION FOR REAL-TIME AND NON-REAL-TIME PRODUCTION

BACKGROUND

Content providers have struggled in providing consumers with video content that is digestible in a variety of formats and is targeted to a local audience, but is linked to the content provider. As part of providing content in traditional formats, such as in a television news broadcast, much of the content created may be cut in editing; leaving large portions of related content available for use that are differentiable from those presented in the initial provision of content that may be attractive for use in alternative formats.

SUMMARY

The present disclosure describes, in one embodiment, a method for content aggregation and distribution for real-time and non-real-time production of video content items comprising: receiving, at a first device from a second device, an annotated video stream that includes a principal material in a principal spectrum that is in-band for a display device and a supplemental material in a supplemental spectrum that is out-of-band for the display device; and in response to receiving, from the first device, an indication that the principal material is secondary content and that the supplemental material is primary content: repackaging the annotated video stream to include the supplemental material in the principal spectrum.

In another embodiment of the invention described herein, a non-transitory computer readable medium is provided that includes instructions that are executable by a processor to perform an operation for content aggregation and distribution for real-time and non-real-time production of video content items that comprises: receiving, at a first device from a second device, an annotated video stream that includes a principal material in a principal spectrum that is in-band for a display device and a supplemental material in a supplemental spectrum that is out-of-band for the display device; and in response to receiving, from the downstream device, an indication that the principal material is secondary content and that the supplemental material is primary content: repackaging the annotated video stream to include the supplemental material in the principal spectrum.

In a further embodiment of the invention described herein, a device is provided for content aggregation and distribution for real-time and non-real-time production of video content items that comprises a processor; and a memory, including instructions that when executed by the processor enable the device to: receiving, from an upstream device, an annotated video stream that includes a principal material in a principal spectrum that is in-band for a display device and a supplemental material in a supplemental spectrum that is out-of-band for the display device; and in response to receiving an indication that the principal material is secondary content and that the supplemental material is primary content: repackaging the annotated video stream to include the supplemental material in the principal spectrum.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
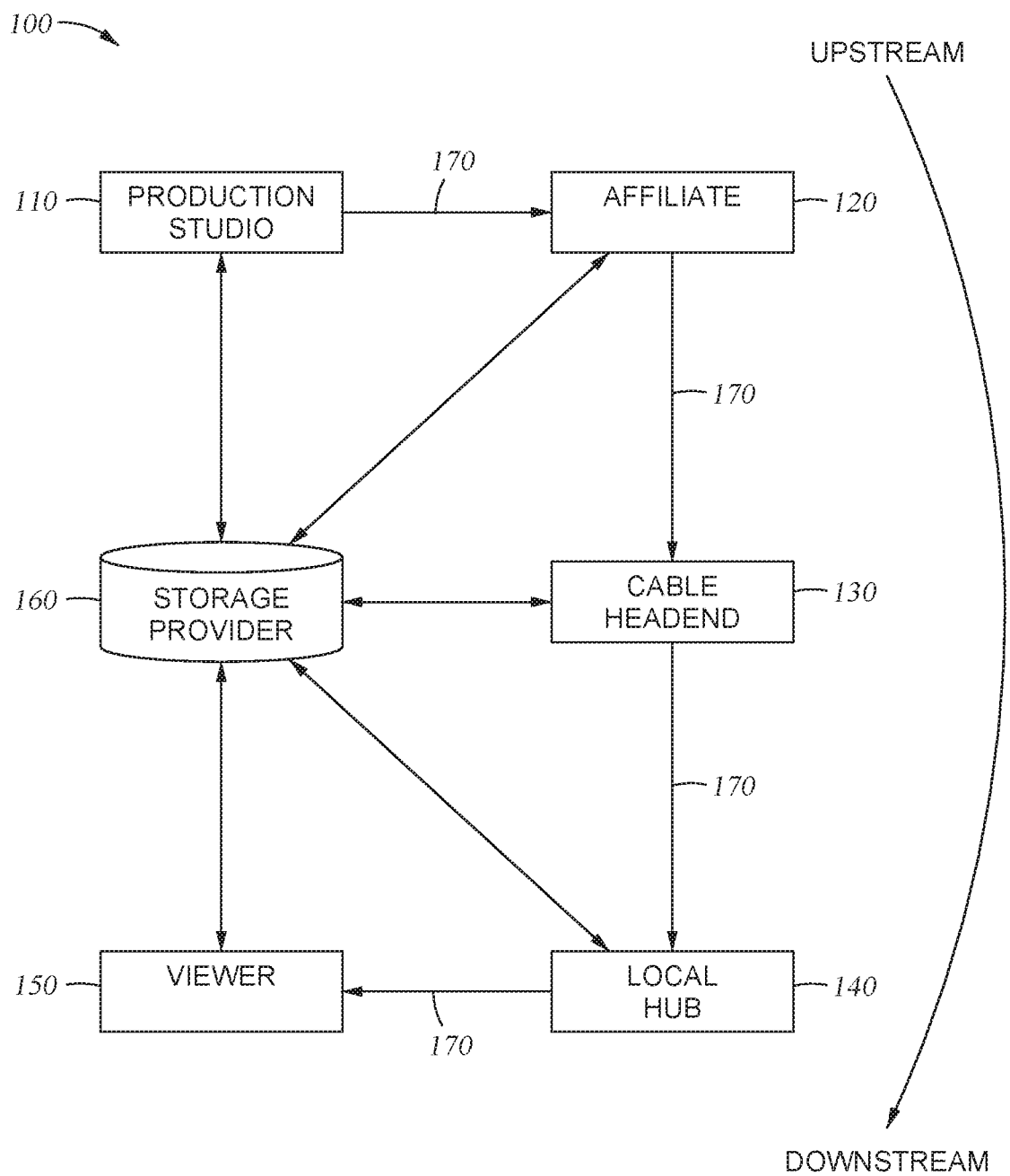
FIG. 1 illustrates a content delivery pathway for a video stream, according to aspects of the present disclosure.

The present disclosure provides systems and methods for providing downstream entities with greater customizability of the content received from upstream entities. A content producer or other upstream entity may make a larger portion of a content available to downstream entities (e.g., a local affiliate, a cable head-end, a local hub, an end-user) both in real-time and in non-real-time applications so that the downstream entities may select which content to present or consume as primary content, and which content is to be provided as secondary content. For example, a news program may produce material in addition to that material designated as the principal material, which may be made available out-of-band (OOB) from the principal material. Several downstream affiliates may receive the video stream of the news program, including the principal material and OOB supplemental material, and select based on local preferences whether to use the supplemental material instead of or in conjunction with the principal material. These selections may be made manually or via automated rules to select all or some of the secondary content for inclusion in cooperation with or instead of the originally selected primary content.

Continuing the example, a national news program may include a short segment on a local story for which additional content was produced but not included for the national broadcast as the principal material for that news program, and a local affiliate affected by that local story may access the additional content for presentation with or instead of the nationally selected principal material as supplemental material for entities downstream of the local affiliate. An upstream entity may make several elements of additional content available for selection by downstream entities. For example, the news program may be presented with X additional clips of content and Y additional graphics, and the downstream entity may choose all X of the additional clips to include with the primary content and (Y-n) of the additional graphics for display.

As used herein, the term "video stream" shall refer to the set of content delivered over a Content Distribution Network (CDN) that includes time-sequenced audio-visual data and supporting data organized for distribution through the CDN for eventual output at a viewing device. A video stream may include a "principal material" and one or more "supplemental materials," which may be adjusted by each entity in the CDN for delivery to the downstream entities in the CDN. Principal materials are those portions of the video stream that are formatted for output on the viewing device by an upstream entity, while supplemental material are those portions of the video stream that the upstream entity includes, but not for initial display on the viewer device. The initial producer may organize and publish the principal material in a first format (e.g., a television broadcast, an internet video) and publish the supplemental material(s) in the first or a different format in the video stream. Examples of supplemental materials include, but are not limited to: extended portions of the content included in the principal material, scripts, content produced but not included in the principal material (e.g., alternative camera angles, whole segments cut for time), metadata, links to related principal materials or supplemental materials (e.g., an earlier program segment in a series, a different version of the material (e.g., a 3-D version of a 2-D program or vice versa), ancillary content (e.g., maps, graphics), secondary audio channels, and the like).

As used herein, "upstream" and "downstream" are relative terms in a content chain in which a content source is upstream from entities that receive the content for consumption and in which entities are downstream from the sources from which content is received. In a CDN, several entities may be both content sources and content consumers, and thus may be both upstream from some entities and downstream from other entities.

The supplemental material may be organized in various ways such that elements that were produced, but not initially selected for inclusion in the primary material, are available for downstream entities to use and repackage for consumption. All of the elements that were produced are available to downstream entities, whether directly included in a parallel delivery stream or via reference to a storage location from which the supplemental material may be retrieved from. Various metadata, described in greater detail elsewhere in the present disclosure, may define relationships between elements of content (principal or supplemental) so that various entities may repackage the output of content both on-the-fly with linear content or atemporally with non-linear content.

Additionally, downstream entities may expand the library of supplemental material with locally-produced or entity-specific content that is made available to entities further downstream. For example, producer of a national program may set a segment of primary material for a weather report a region of the country and make supplemental material for state- or province-specific weather reports in that region available, and a local affiliate may produce additional supplemental material that provides a more in-depth localized weather report for a specific broadcast area, which is made available as additional supplemental material for entities downstream of the local affiliate. Each entity may thereby seamlessly integrate different content elements for transmission to downstream entities for localized and customized consumption. Localized entities may thereby maintain a look and feel of an original national or regional content item when inserting localized content, or may alter the look-and-feel of a national or regional content item to suit the preferences for a localized audience (e.g., substitute affiliate logos for national logos, use segments that substitute localized terminology or pronunciations for the original (e.g., pop versus soda, crawfish versus crayfish, whether the first or last syllable of pecan is stressed), switch between Fahrenheit and Celsius).

As discussed herein, a video stream or portion thereof (whether principal or supplemental material) may be considered "primary content" or "secondary content" by an entity. The designation of content to be primary or secondary is determined by the specific entity; primary content is that content in which the entity has expressed primary interest, and secondary content includes that content that the entity has lesser interest in. For example, an entity may consider a nightly news program as "primary content," while a severe weather alert, advertisement, stock ticker, etc., included or inserted into the news program may be considered to be "secondary content" by that entity. In another example, a first entity may consider a sports broadcast that overruns an associated timeslot into a timeslot for a sitcom to be primary content and the sitcom to be secondary content, while a second entity may consider the sports broadcast to be secondary content and the sitcom to be primary content. In a further example, a downstream entity may consider content designated by an upstream entity as principal material to be of secondary interest, but consider a supplemental material to be of primary interest, and thus may select to repackage the video stream to present the supplemental material as principal material to entities further downstream in the CDN. In various embodiments, secondary content may fully interrupt the display of primary content, partially obscure primary content (e.g., via picture-in-picture (PIP) display), move and adjust the display of primary content on a viewing device, and the like.

A video stream may deliver linear content or video on demand (VOD) content. VOD content may be stored at one or more storage locations for remote access and delivery by various entities at a time of the requesting entities' choosing. In contrast, linear content is transmitted according to a schedule for distribution set by an upstream entity and is disseminated to one or more downstream entities in a broadcast (either by wired or wireless transmissions). Linear content may include live content (e.g., the broadcast of a sporting event in progress), pre-recorded content (e.g., a sitcom or movie), and mixtures of live and pre-recorded content (e.g., a news program with live anchors introducing a pre-recorded story). As will be appreciated, linear content may be spooled for temporary storage or digital processing (e.g., for the insertion of graphics or pre-recorded content, buffering and error correction) on the devices of various entities, and may remain stored according to a Time to Live (TTL) value until the linear content is output to a next entity in the CDN or deleted from storage.

The content aggregation and distribution methods and systems discussed herein provide content in real-time and non-real-time productions with greater flexibility than in prior methods and systems, allowing downstream entities to choose, on the fly, how to adjust and re-transmit a stream of content for localized consumption. It will be appreciated that by enabling more entities to quickly and easily control the distribution of content in a CDN, improvements in the devices used by those entities are realized, among other benefits. These benefits include, but are not limited to: reductions in the use of processor resources in editing content, improved memory use in storing/retrieving content, improved bandwidth allocation in providing relevant content (and not using bandwidth on irrelevant content), user interface experience improvements, and other improvements that will be apparent on review of the present disclosure.

FIG. 1 illustrates a content delivery pathway 100 for a video stream 170 including entities of a production studio 110, an affiliate 120, a cable headend 130, a local hub 140, and a viewer 150. The production studio 110 and the affiliate 120 may each produce video streams 170 that are transmitted to one or several downstream entities or an out-of-stream storage provider 160. For example, a production studio 110 may transmit a video stream 170 to several downstream affiliates 120 or a storage provider 160 via satellite uplink/downlink, microwave transmission over air, over fiber-optic cabling, etc. In turn, each affiliate 120 may transmit the video stream 170 to one or more cable headends 130 or a storage provider 160 via satellite uplink/downlink, microwave transmission over air, over fiber-optic cabling, etc. Similarly, the cable headend 130 is in communication with one or more downstream local hubs 140, and each local hub 140 is in communication with one or more downstream viewers 150 to distribute the video stream 170.

Although, for purposes of simplicity, only one of each entity is illustrated at each tier of the content delivery pathway 100, the present disclosure envisions embodiments in which more than one of each entity type is present at each tier of a CDN; forming a web of content delivery pathways 100 for various video streams 170. Additionally, in some embodiments, the production studio 110 and affiliate 120 may be combined into one entity, or an affiliate 120 may produce a video stream 170 and a production studio 110 may be omitted from a content delivery pathway 100 for a given video stream 170.

Each entity may send and receive the video streams 170 via various computing devices and transmission media. Computing devices include, but are not limited to, server computers, personal computers (e.g., desktops, laptops, smart phones), set top boxes, digital video recorders, smart televisions, and the like. Such computing devices include processors and memory storage devices that include processor executable instructions to enable the computing device to send, receive, package, or output for playback the video streams 170 described herein.

A communications pathway between the devices of a given upstream entity and a given downstream entity may be assigned various wavelengths/frequencies, time divisions, or combinations thereof so that an upstream entity may communicate with several downstream entities in the next tier of the CDN using a shared transmission medium (e.g., over the air, a fiber optic cable, a wire). As used herein, an upstream entity's device transmits the video stream 170 to a downstream entity's device in a portion of the spectrum (whether classified by wavelength or frequency) assigned for that downstream entity. In various embodiments, certain portions of the communications pathway may be designated as "in-band," and carry primary content for consumption by a downstream entity, while other portions of the communications pathway may be designated as "out-of-band" to carry supplemental material for selective consumption by the downstream entity. Material carried out-of-band is accessible to the entities, but is located outside of the frequencies/wavelengths/packets associated with displayable content, and may need to be bandshifted or decompressed to be displayed by a display device. In contrast, the material carried in-band is the material that is (when received by a display device) output to a viewer with no further processing beyond the transmission standard used by the display device. Several specifications used in the transmission of content may specify various portions of the spectrum or available portions of datagrams that may be reserved for OOB communications.

Any of the entities' devices may access the storage provider 160 to store or retrieve additional content, as the storage provider 160 is out-of-stream. The entities in the CDN may access the storage provider 160 by various protocols, including IP-based protocols to request the storage or retrieval of content stored by the storage provider 160 in association with the video stream 170.

Figure 2A:
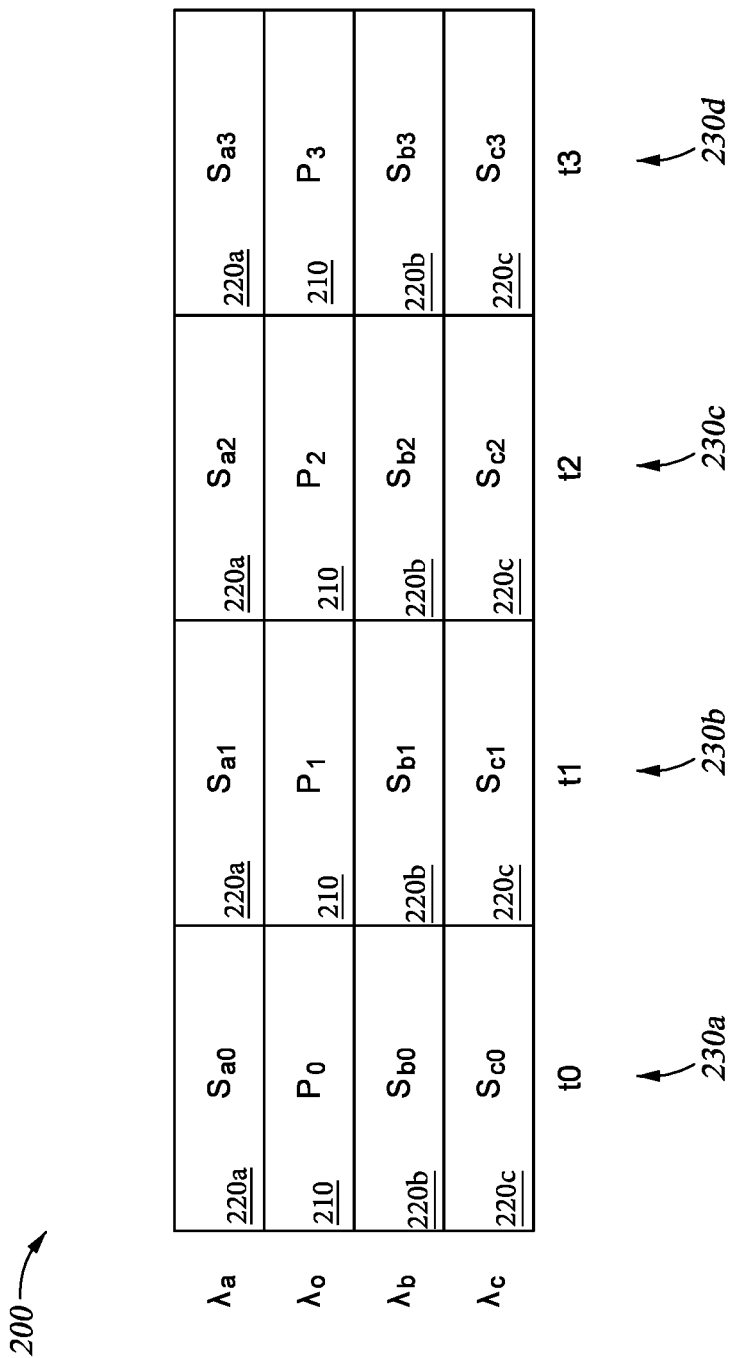
FIGS. 2A and 2B illustrate a section of a video stream as may be received and repackaged for retransmission, according to aspects of the present disclosure.
Figure 2B:
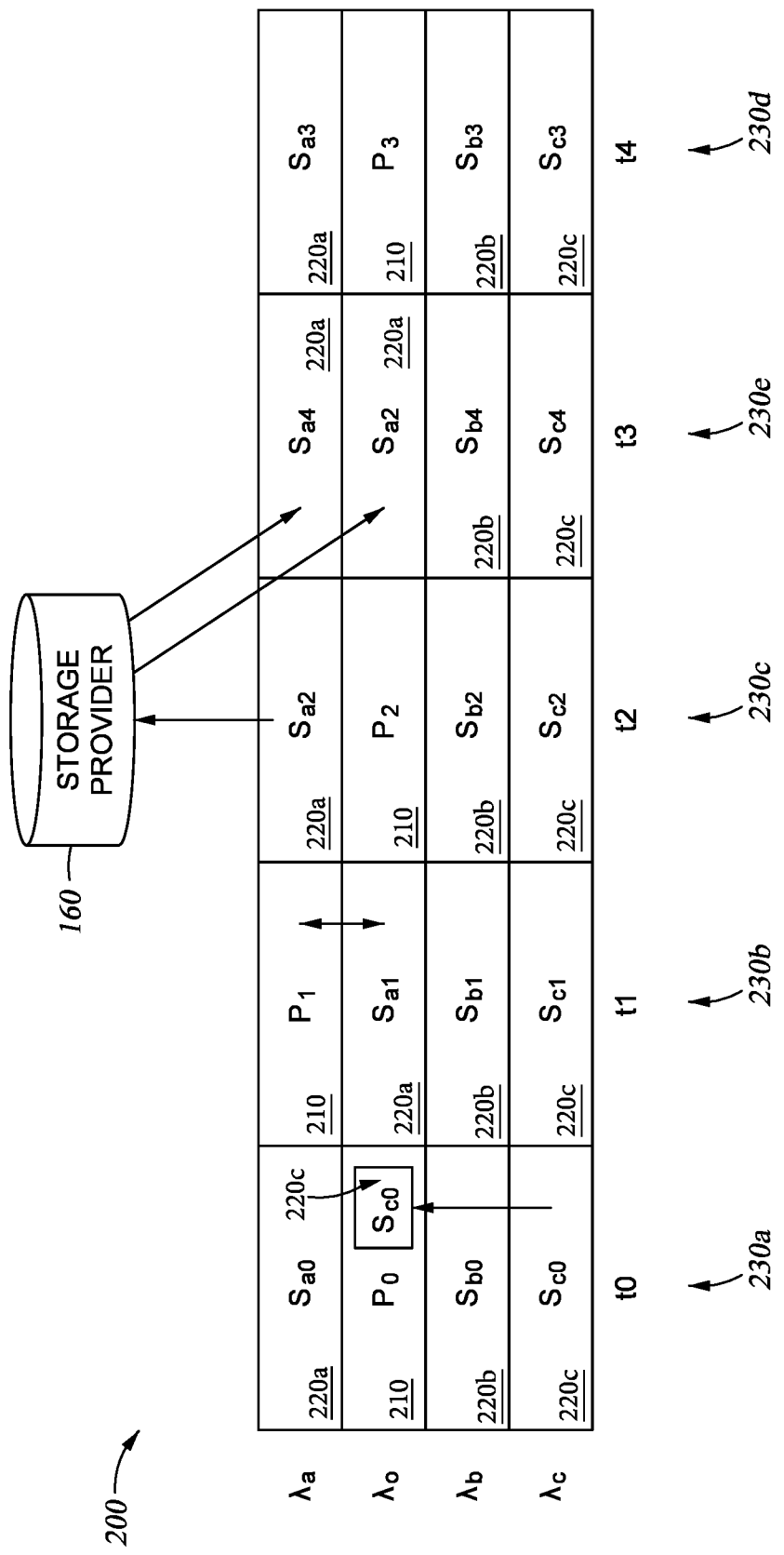

FIG. 2A illustrates a section 200 of a video stream 170 as may be sent from an upstream entity to a downstream entity. FIG. 2B illustrates a repackaging of the section 200 of FIG. 2A by the receiving entity for delivery to an entity further downstream or output for display on a viewing device. For example, an affiliate 120 may receive the section 200 as packaged in FIG. 2A from a production studio 110, and repackage the section 200 to the state shown in FIG. 2B for delivery to one or more cable headends 130 for later delivery through associated cable fiber/coax networks to local hubs 140 and associated viewers 150, or the affiliate may transmit the repackaged video stream 170 via over-the-air broadcast to various viewers 150.

With linear content in a CDN, each upstream entity typically controls how the entities in the next-lower tier of the CDN are provisioned content, although in some cases a downstream entity may request different content (e.g., a section 200 having a different profile/format, a different channel) from the entity in the next-higher tier of the CDN. Each element of the video stream 170 may be sent in different packets or on different portions of the available spectrum for consumption by downstream entities according to a broadcast schedule. As illustrated in FIG. 2A, in timeslots $t_0$-$t_3$, the upstream entity has packaged the video stream 170 to provide packets of principal material 210 in a principal portion of the available spectrum (e.g., at wavelengths $\lambda_0$), a first supplemental material 220a, a second supplemental material 220b, and a third supplemental material 220c in secondary portions of the available spectrum (e.g., at wavelengths $\lambda_a$, $\lambda_b$, and $\lambda_c$, respectively).

In other embodiments, the data are transmitted in parallel data paths via different Packet Identifier (PID) in a transport stream (e.g., within a container file format, such as, for example, the Motion Pictures Experts Group (MPEG) container file format) using a single portion of the available spectrum, via different and separate IP addresses for multicast or unicast streams, or at specified frequencies ($f_0$, $f_a$, $f_b$, $f_c$, etc.) in a modulated Radio Frequency burst or broadcast. The labels of the sections 200 of the video stream 170 as related to wavelength are provided herein as a non-limiting examples of how content may be packaged and distributed with principal material 210 and supplemental material 220; one of ordinary skill in the art may freely substitute PIDs, destination addresses, and frequencies for wavelengths in the examples given herein without departing from the spirit and scope of the present disclosure. Indeed, as different entities use different transmission media to communicate to one another, one entity may receive the section 200 packaged via specified frequencies over the air and repackage the section 200 for transmission over fiber optic cables to a downstream entity via specified wavelengths, IP addresses, or PIDs.

In various embodiments, $\lambda_0$ corresponds to those portions of the spectrum that are in-band for the display of content on a viewing device, while wavelengths $\lambda_a$, $\lambda_b$, and $\lambda_c$ correspond to various portions of the spectrum that are out-of-band (OOB) for the display of content on a viewing device. Other parallel delivery schemas (PID, IP addresses, frequencies) may be similarly annotated for the respective spectrum or container space. Although the available spectrum is illustrated as a continuous block of in FIGS. 2A and 2B, in various embodiments, the wavelengths may be discontinuous and separated by wavelengths defining or assigned to other channels. Additionally, although three series of supplemental material 220a-c are illustrated in FIGS. 2A and 2B, in other embodiments more or fewer series of supplemental material 220 may be provided in association with corresponding series of principal material 210 packets in a section 200.

The content included in one timeslot is generally referred to herein as a segment 230. As will be appreciated, a segment 230 may refer to a set of audio-visual data corresponding to an individually decodable portion of content in a television program, but the use of the term herein is not so limited. In some embodiments, the segment 230 may correspond to the data and metadata for a video frame of content in a television program, a set of video frames of variable number, or a set of video frames of a fixed number (e.g., corresponding to s seconds of video). In other embodiments, a segment 230 may refer to a portion of a television program corresponding to a break point in the action conveyed in the video stream 170 (e.g., a play in a sport, a story in a news program, a scene in a sitcom, a chapter in a movie). The video stream 170 may be annotated to indicate and identify the segments 230 in the video stream 170, where each segment 230 begins/ends, how long a given segment 230 lasts, previous and subsequent segments 230 that make up the video stream 170, and the like. The entities in the CDN may use the metadata included in an annotated video stream 170 to identify various points in the content of the video stream 170 at which control of the content may pass to the downstream entity from the upstream entity.

In various embodiments, an annotated video stream 170 may include at least one of the series of supplemental material 220a-c with metadata formatted according to the Society of Cable Telecommunications Engineers (SCTE) 224 standard. SCTE 224 provides an Event Scheduling and Notification Interface (ESNI) to describe events within the section 200 of the video stream 170 and policies for how the content in the video stream 170 may be handled. The message set in the SCTE 224 metadata may specify the individual programs scheduled for provision as principal material 210, and indicate various rules for the display of the content based on the audience receiving the video stream 170. For example, the SCTE 224 metadata may identify that trick-play options (e.g., fast forward, rewind, record, skip) may be disabled/allowed, that certain content is to be blacked-out/presented for certain providers, geographies, device types, etc. The SCTE 224 metadata allows for the downstream entities to identify, in non-real-time, whether content that is scheduled for provision should be substituted with different content before a video stream 170 is received from an upstream entity and retransmitted to a downstream entity.

In some embodiments, an annotated video stream 170 may include at least one of the series of supplemental material 220a-c with metadata formatted according to the SCTE 104 or 35 standards (SCTE 104/35) to define insertion points in the video stream 170 at which an entity may substitute supplemental material 220 for principal material 210 or begin playback of supplemental material 220 along with the principal material 210. For example, SCTE 104/35 metadata may indicate which frames in the video stream 170 are I-frames, P-frames, and B-frames, when a given segment 230 ends in the video stream 170, where a given break in the content of the video stream 170 exists (e.g., the end of one program and the start of the next program). The SCTE 104/35 metadata allows for the downstream entities to identify, in real-time, whether linear content being received for provision via the video stream 170 may be substituted with different content on-the-fly (i.e., as the content is received from an upstream entity and is retransmitted downstream).

In various embodiments, the metadata contained in the segment 230 may reference other series of supplemental material 220a-c to provide additional content for display in conjunction with or instead of the content designated as the principal material 210 in the segment 230. In some cases, the supplemental material 220a-c may include the additional content that is available for display, or may include a reference to access the content from a storage provider 160 for output by the downstream entity.

A receiving entity may use the metadata contained in one or more portions of supplemental material 220a-c in conjunction with an indication that the supplemental material 220 is of primary interest to the receiving entity (i.e., is primary content) to include the supplemental material 220 in the primary spectrum of the video stream 170. In various embodiments, an indication that the supplemental material 220 is primary content or that the principal material 210 is secondary content may be received via a user command, indicated by a correlation of location metadata to a specific geographic location of interest for the entity, indicated by a correlation of rating metadata to a parental control (e.g., with a rating no higher than PG or TV-Y7). For example, a user may manually specify some or all of the supplemental materials 220 are to be included in the primary spectrum. In another example, the user may specify automated rules that a user device employs to select some or all of the supplemental materials 220 are to be included in the primary spectrum on behalf of the user. Metadata may also provide rules for how, where, and when the supplemental material may be included in the primary spectrum. For example, a terminus or end time of a segment 230 ends may specify where a new segment 230 of content may be inserted. In another example, content sizing rules may specify that a given element of supplemental material 220 must be shown full-screen, at least quarter screen, or in a given size or location relative to an element of principal material 210 that must remain in the primary spectrum.

Depending on the metadata included in the principal material 210 or the supplemental material 220, and how and by whom the indication of primary/secondary interest was triggered, the supplemental material 220 may be presented in different ways for output in the primary spectrum. Additionally, supplemental material 220 may include underlying content that is to be included in the primary spectrum for output, or may include references or pointers (e.g., a Uniform Resource Locators (URL), an IP (Internet Protocol) address, a Globally Unique Identifier (GUID)) to underlying material that is retrieved and inserted into the video stream 170 in the primary spectrum for output.

In one example, as shown in timeslot $t_0$ in FIGS. 2A and 2B, supplemental material 220c may be inserted into a shared video frame with the principal material 210 for display in a portion of the available display space alongside or over the principal material 210 in the corresponding timeslot. Examples of use cases for shared frame insertion include, but are not limited to: the insertion of closed captions, actor names, trivia, etc. for display over a video, insertion of a secondary audio track for playback with/instead of a primary audio track; an overlay of a weather alert or graphic shown on a portion of the screen real estate used by the principal material 210; etc. In various embodiments, insertion of supplemental material 220 into a shared frame with the principal material 210 may overlay the supplemental material 220 over the principal material 210, adjust the size and location of the principal material 210 to accommodate the co-display of the supplemental material 220, and the metadata may specify various rules for the sizing and location for the principal material 210 and the supplemental material 220 when sharing a frame.

In another example, as shown in timeslot $t_1$ in FIGS. 2A and 2B, supplemental material 220a may be substituted for principal material 210 within a timeslot. In various embodiments, the principal material 210 may be shifted from the primary spectrum to a supplemental spectrum formerly occupied by the supplemental material 220 (and may thus be treated as supplemental material 220 by the next receiving entity), may be shifted to another timeslot (e.g., the timeslot following the inserted supplemental material 220), or may be removed from the video stream 170. Examples of use cases for content substitution, but are not limited to: outputting a more in-depth (i.e., longer or localized) version of the content for a particular audience; time shifting segments within a program; etc. The metadata included in the supplemental material 220 may indicate a schedule for the current and upcoming principal material 210, and various rules defined where and when supplemental material 220 may be substituted for principal material 210 in the video stream 170.

As will be appreciated with linear content delivery, substituting one content element for another may affect the delivery of the content if the two elements are not equivalent in length, or if the substitution does not begin or end at a time in the linear content video stream 170 that allows for a clean transition from the prior segment 230 or to the next segment 230 in the linear video stream 170. Metadata (e.g., SCTE 104/35 metadata) may specify the lengths of the elements of content that may be substituted for each other and where playback/insertion may begin relative to one segment 230. In some embodiments, the metadata may annotate various regions of supplemental material 220 that may include "padding" or other portions of the supplemental material 220 that may be added to or cut from the supplemental material 220 when substituting for various lengths of principal material 210.

As will be appreciated with non-linear content delivery, such as VOD, substituting one content item for another may induce rubber-banding into the video stream 170, as the video stream 170 does not need to remain a constant length but may expand or contract in total length of delivery and playback time when content items of different lengths are substituted for one another. The rubber-banding may be un-noticed by the viewer 150 in relation to the content played back, but various metadata markers, such as a progress bar for playback of a program, may be adjusted in response to the substitution of one content item for another of a different length. Additionally, with mixed-linearity content delivery, in which some content is linear and some is non-linear, the viewer 150 may also be supplied a seamless viewing experience between substituted content items regardless of whether the content item substituted in or substituted out is linear or non-linear. For example, a cable headend 130 may provide a viewer 150 with a VOD content item and substitute linear content items into the VOD playback instead of portions of the non-linear content that are part of the VOD content item, such as when a currently airing weather alert (linear content) replaces a portion of the VOD content item (non-linear content).

In a further example, as shown in timeslots $t_2$ and $t_3$ in FIGS. 2A and 2B, supplemental material 220a may be spliced into the video stream 170 at a later timeslot from where that supplemental material 220a was originally included in the video stream 170. For example, a viewer may be consuming the video stream 170 and provide a command that additional information related to the principal material 210 output at $t_n$ is desired. The command may reference the supplemental material 220 in timeslot $t_n$ corresponding to the currently displayed segment of principal material 210 and request the additional information from a storage provider 160 or an upstream entity, and the additional information may be spliced into the video stream 170 at $t_{n+x}$ after the principal material 210 reaches a break in the content. In this example, the supplemental material 220a in a first supplemental spectrum $\lambda_a$ is used to query a storage provider 160 for material related to the principal material 210 for segment 230c, and the underlying material is spliced into the video stream 170. In various embodiments, the material that is spliced into the video stream 170 pushes content in the initial time slot backwards in the time series, for example the fourth segment 230d in FIG. 2A is at timeslot $t_3$, but is pushed back to timeslot $t_4$ in FIG. 2B when the content in the fifth segment 230e is spliced into the video stream 170. To accommodate the need for additional time for output to a viewer when inserting content into a live or otherwise linear video stream 170, an inserting entity may drop segments 230 from the video stream 170, allow one segment 230 to overrun and replace another later-scheduled segment 230, include a first segment 230 in a second segment 230 as picture-in-picture or side-by-side output, etc. Video streams 170 of non-linear content or mixed-linearity content may expand and contract in length to accommodate inserted material, or may attempt to maintain an original length by dropping segments 230, allowing one segment 230 to overrun and replace another segment 230, include a first segment in a second segment 230, etc.

Metadata in the annotated video stream 170 may indicate which entities are allowed to use which supplemental material 220, how those entities are allowed to include the supplemental material 220 in the video stream 170 (e.g., inserting, splicing, substituting), how often within a given time period those entities are allowed to include supplemental material 220 (e.g., n times per h hours, m times on a given day), and which supplemental material 220 are available for which entities. For example, a production studio 110 may provide a first affiliate 120 and a second affiliate with the same annotated video stream 170. The metadata may indicate that the first affiliate 120 is barred from including a first supplemental material 220a in a repackaged video stream 170 for the cable headends 130 downstream from the first affiliate 120, but is allowed to include a second supplemental content 220b. In contrast, the metadata may indicate that the second affiliate 120 may repackage the video stream 170 for the downstream cable headends 130 using the first supplemental material 220a or the second supplemental content 220b, but may only do so one time between noon and midnight on a given day. The metadata may combine any of the use parameters discussed herein, and is not limited to the parameters illustrated in the example scenarios provided herein.

Figure 3:
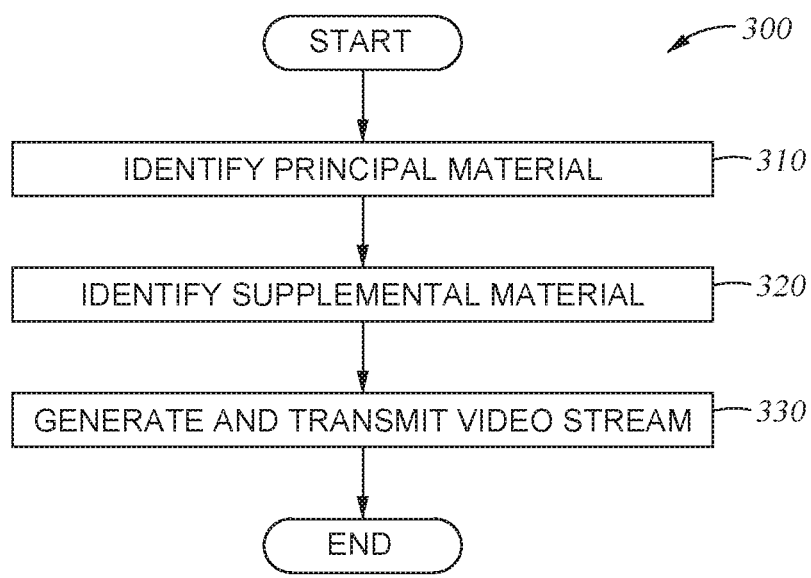
FIG. 3 is a flowchart of a method for annotating a video stream, according to aspects of the present disclosure.

FIG. 3 is a flowchart of a method 300 for annotating a video stream 170. Method 300 begins at block 310, where an entity determines principal material 210 for inclusion in the video stream 170. For example, a production studio 110 may create a television program, and designate the final cut of the episode as the principal material 210 for broadcast. In another example, in a live broadcast, a mobile production studio 110 may mix audio and video channels from several cameras to create a cut designated for broadcast as the principal material 210.

At block 320, the entity producing the video stream 170 identifies supplemental material 220 to include in the video stream 170. In various embodiments, the supplemental material 220 includes additional frames of video content (e.g., material cut from the principal material, additional graphics, related video content) that may be stored by the producing entity or at a storage provider 160, The supplemental material 220 may also include non-video content such as scripts for the principal material 210, metadata produced in relationship with the principal material 210 or other supplemental material 220 already selected for inclusion in the video stream 170, and metadata related to the linear content schedule of several programs offered by the entity. The metadata included in various embodiments may annotate the video stream 170 to identify the boundaries between segments 230 in the video stream 170, the identity and length of the segments 230, presence and relationship between supplemental material 220 and principal material 210 (e.g., what the supplemental material 220 contains relative to the principal material 210), etc. The metadata may also annotate one or more of the principal material 210 and the supplemental material 220 to outline use parameters by downstream entities; specifying which content items may be used by which downstream entities, and how those downstream entities may use the content items.

At block 330, the entity producing the video stream 170 generates and transmits the video stream 170. As generated, the video stream 170 includes the principal material 210 in a principal portion of the spectrum (i.e., in-band) assigned for communications with a destination downstream entity and the supplemental material 220 in one or more supplemental portions of the spectrum used for OOB communication with the destination downstream entity.

Figure 4:
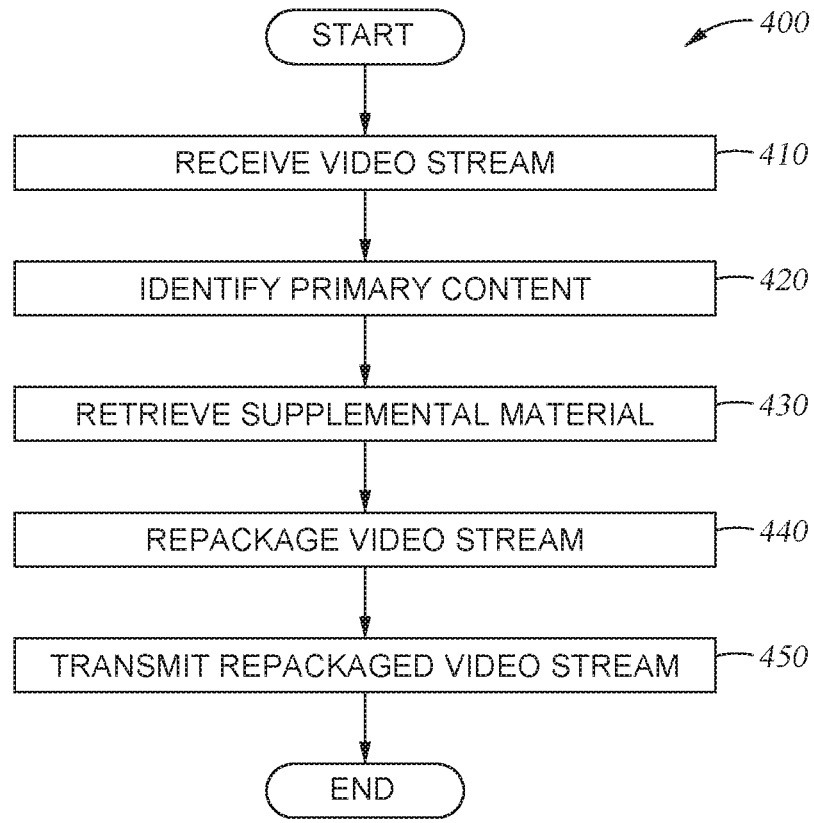
FIG. 4 is a flowchart of a method for adjusting output of content according to an annotated video stream, according to aspects of the present disclosure.

FIG. 4 is a flowchart of a method 400 for adjusting output of content according to an annotated video stream 170. Method 400 may be performed on-the-fly by a given entity as the annotated video stream 170 is received from an upstream entity and retransmitted to entities in the next tier of the CDN downstream from the given entity. As will be appreciated, the given entity may also perform one or more actions in preparation of on-the-fly adjustments (e.g., pre-fetching supplemental material 220 to include in the video stream 170), or may retransmit the annotated video stream 170 without modification from the version received by the given entity. Method 400 may describe actions taken by an affiliate 120, a cable headend 130, a local hub 140, or a viewer 150 in various embodiments. The annotations enable a non-producing entity to refocus the presentation of content included or referenced in the video stream 170 to the interests of an intended audience.

Method 400 begins at block 410, where a device of a receiving entity receives the annotated video stream 170 from a transmitting device of an upstream entity. The annotated video stream 170 includes various content divided across different portions of the spectrum that the receiving device is tuned to receive on. Principal material 210 is received in-band on a principal portion of the spectrum that is designated for output of that principal material 210 according to the standard(s) used for transmitting and receiving video content. Supplemental material 220 is received OOB from the principal spectrum on one or more portions of the spectrum designated as supplemental spectra.

At block 420, the entity identifies primary content from among the content identified in the annotated video stream 170. In some embodiments, the entity additionally or alternatively identifies secondary content among the content identified in the annotated video stream 170. Primary content includes the segments 230 of content that are deemed of primary interest for output to the entity, which may be based on personal preferences or expected preferences of entities further downstream. In contrast, secondary content includes those segments 240 of content that are deemed to be of lesser interest for output by the entity, which may be based on personal preferences or expected preferences of entities further downstream.

As will be appreciated, an upstream entity endeavors to transmit a stream of linear content that will be interpreted as primary content by the downstream entities, and accordingly selects the principal material 210 for inclusion in the video stream 170 that is expected to be consumed by the largest number of viewers 150. Because the CDN provides for distribution of the video stream 170 over a large geographical area, and the entities closer to the viewers 150 have smaller audience sizes than entities further from the viewers 150 in the content delivery pathway 100, downstream entities may have a better idea what the viewers 150 will actually consider to be primary content than upstream entities. A given entity may therefore repackage the video stream 170 from the version received from an upstream entity so that supplemental material 220 of primary interest is included in the principal spectrum (e.g., as all or part of the principal material) for output by entities further downstream from the given entity.

In one embodiment, the primary/secondary interest in particular content may be indicated by the receiving device reading regional tags in the metadata annotating the video stream 170 and noting that the geographic range service by the corresponding entity matches, includes, or is included in the regional tags. For example, a video stream 170 may include a weather report for a first region of the country as principal material 210 and a weather report for a second region of the country as supplemental material 220. As each affiliate 120 receives the annotated video stream 170, the individual affiliate 120 may determine, on-the-fly, whether to substitute the second weather report for the first weather report and may accordingly retransmit the annotated video stream 170 with the first weather report as principal material 210 or the second weather report as principal material 210 to downstream entities. Additional embodiments may use content rating tags, digital rights management tags, timing tags or other usage parameters for the receiving entity to determine whether to include supplemental material 220 into the primary spectrum.

In another embodiment, the primary/secondary interest in particular content may be indicated manually by an entity. For example, a supplemental material 220 included in an annotated video stream 170 may specify several traffic reports (e.g., for routes X, Y, and Z) that may be inserted into a shared frame with the principal material 210 of a weather report for a region. None of the example traffic reports may be initially chosen by an upstream provider for inclusion in the primary material, but a viewer may manually indicate a primary interest in a traffic report related to route X (e.g., via a remote control, touch screen, voice or other command). The viewer device receives the manual indication, and acts to insert the supplemental material 220 related to route X into the primary spectrum with the weather report for output and display to the viewer.

At block 430, the entity retrieves supplemental material 220 that has been indicated as primary content. In some embodiments, the supplemental material 220 includes a reference to underlying content that may be included in the primary spectrum, which may be stored outside of the content delivery pathway 100 at a storage provider 160 or in a local repository for the entity. The underlying content may be pre-fetched (i.e., retrieved before the affected section 200 of the video stream 170 is received by the entity) or may be accessed in real-time (i.e., as the entity is receiving the affected section 200 of the video stream 170) for inclusion in the primary spectrum. In embodiments where the supplemental material 220 includes the underlying content (rather than a reference thereto), retrieving the supplemental material 220 may include processing the supplemental spectra to interpret the content included therein. For example, a cable set top box may interpret the content by decoding the data that are in band for display on a television, which may include decryption, caching, error correction/packet dropping, interlaced or progressive scan, and other data analysis and hardware control techniques.

At block 440, the entity repackages the video stream 170 for transmission for entities further downstream in the content delivery pathway 100.

In some embodiments, the devices that the entity uses to transmit content may be different than the devices that the entity uses to receive content, or the standard of transmission may be different, or the assignment of various portions of the spectrum may be different, and the receiving entity will repackage the video stream 170 to account for the different devices, standards, and available spectra. For example, a cable headend 130 may receive content from an upstream affiliate 120 via microwave transmission, and transmit that content to downstream local hubs 140 via fiber optic cables, and will assign different content to different wavelengths on the fiber optic cables. Additionally, due to network conditions, the upstream entity may make several formats and quality levels of the content available, which the re-packaging entity may choose from for transmitting to a downstream entity. Further, an entity may repackage a linear transmission of content to account for caching of content and error correction within the content at various points within the CDN. For example, an affiliate 120 may transmit packets for a television program to a cable headend 130 at a steady rate (e.g., X packets per second), but the cable headend 130 may repackage and retransmit the television program to local hubs 140 with an initial 'burst' of packets (e.g., at 2X packets per second) to establish a cache on a downstream device before handling transmission at a steady rate (e.g., X packets per second) or adjusting the rate to make up for network congestion.

An entity may also repackage the annotated video stream 170 to include supplemental material 220 in conjunction with or instead of the content received as the principal material 210. For example, an entity may insert supplemental material 220 into the principal material 210 in one or more shared video frames to repackage the supplemental material 220 for co-output with the principal material 210 in the primary spectrum. In another example, an entity may substitute supplemental material 220 for the principal material 210 for output including the supplemental material 220 in the principal spectrum instead of the principal material 210 received from the upstream entity. In a further example, an entity may splice supplemental material 220 into the annotated video stream 170 as principal material 210 to time shift the original packaging of the principal material 210.

At block 450, the entity that received the video stream 170 at block 410 retransmits the video stream 170 to one or more devices associated with downstream entities. In various embodiments, the device(s) used to receive the video stream 170 at block 410 are different from the device(s) used to retransmit the video stream 170. The entity may use one device to transmit the video stream 170 to several downstream devices or the entity may use a corresponding number of dedicated transmitting devices to transmit the video stream 170 to one or more downstream devices/entities.

Method 400 may then conclude.

Figure 5:
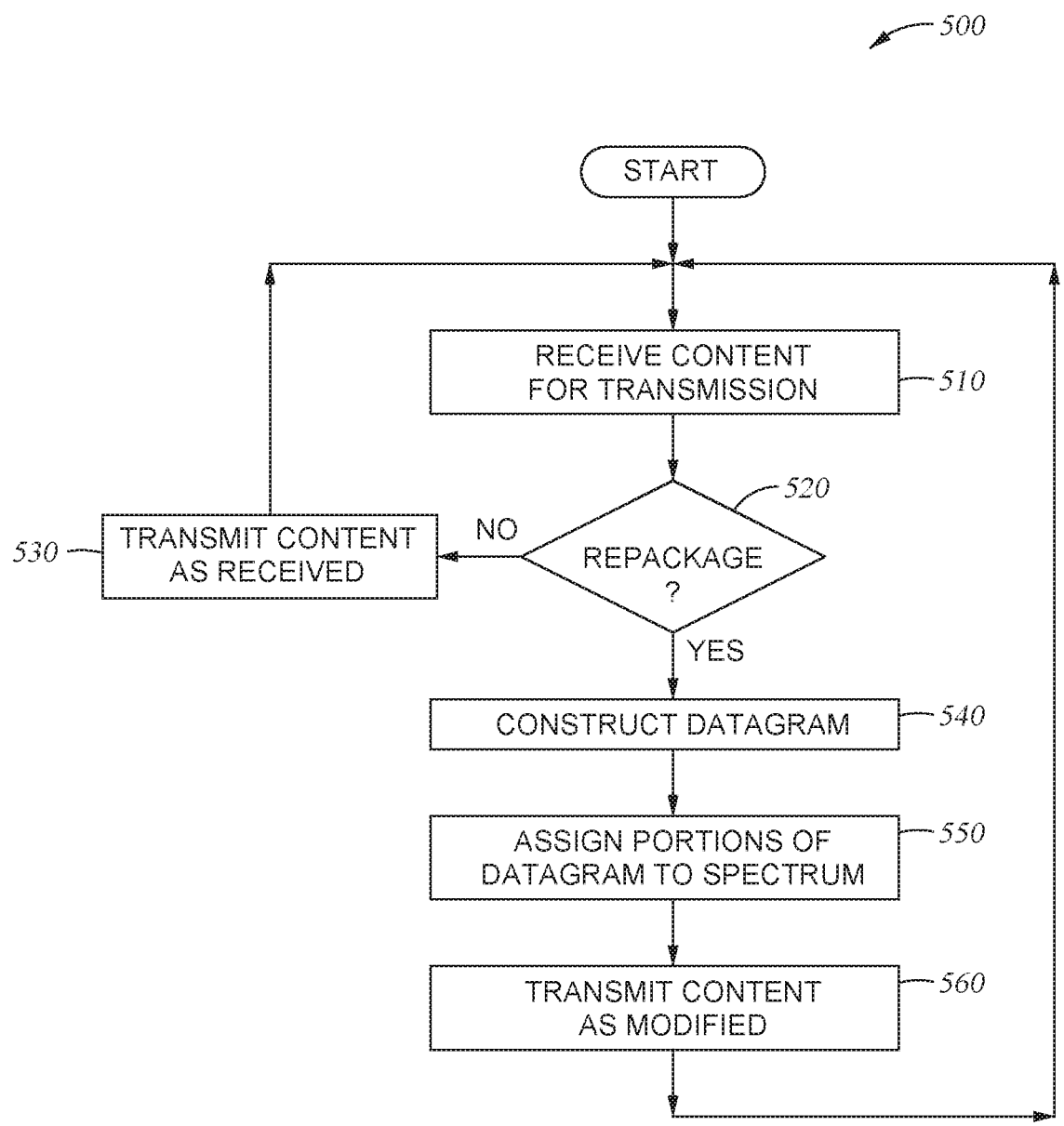
FIG. 5 is a flowchart of a method for adjusting content in an annotated video stream, according to aspects of the present disclosure.

FIG. 5 is a flowchart of a method 500 for adjusting content in an annotated video stream 170, according to aspects of the present disclosure. In various embodiments, the standards used to format the data of an annotated video stream 170 may vary, and each standard may specify different orders of features in a datagram, frequencies/wavelengths that different portions of a datagram may occupy, timeslots that different portions of a datagram may be transmitted during, identifying and error correction features to include in a datagram, etc., and the discussed datagram is provided as a non-limiting example. Portions of method 500 may be practiced as part of block 330 or block 440 in various embodiments.

Method 500 begins with block 510, where a first device receives content for transmission to a second device identified as primary content and as secondary content. In some embodiments, the first device receives the content in a content stream from an upstream device, while in other embodiments the first device receives the content from a database or content source in response to a user command/selection of the content. In some embodiments, in which the content is received in an annotated video stream 170 from an upstream device, the principal material 210 and supplemental material 220 of the stream may be evaluated based on the evaluations and local rules to determine which the first device considers it to be primary content.

At block 520, the first device determines whether to repackage the content for transmission to the second device. When the first device determines to not reformat the content, method 500 proceeds to block 530. When the first device determines to reformat the content, method 500 proceeds to block 540. The determination of whether to reformat the content is based on the format of the content as received and as transmitted by the first device, and user-specified commands or rules. For example, a first device commanded to transmit the video stream 170 without any changes to the underlying content may determine to repackage the content when receiving the video stream 170 via a microwave transmitter and retransmitting the video stream via a fiber optic channel. In another example, a first device that receives a video stream 170 via microwave transmitter and transmits the video stream via microwave transmitter, but has been commanded by a user (or user-specified automated rule) to adjust the content presented in the primary and secondary spectra determines to repackage the content in the video stream 170.

At block 530, the first device transmits the content as-received to the second device according to the standard selected for communication between the first device and the second device. Method 500 may then return to block 510 to handle the content for a next transmission window.

At block 540, the first device constructs a datagram for transmitting the content to a second device differently than the content is presented to the first device. As constructed, the datagram includes the principal material 210 in a principal portion of the spectrum (i.e., in-band) assigned for communications with a destination device according to the transmission specification and any medium/channel assignment for the destination device.

As the bandwidth or packet size constraints for different portions of the available spectrum may vary for in-band and OOB portions of the content, the first device may determine whether to compress data or substitute pointers and annotations for data too large to fit into a new portion of the spectrum. With data received as a pointer or in compressed form, the first device may re-compress the data (further reducing data size) or may decompress the data, to allow a downstream device to receive the content in a format that requires less local processing to consume than the equivalent compressed version. In some embodiments, content may be cached for time shifting (e.g., allowing content to be spliced into the video stream 170) or video data from two sources may be combined to insert supplemental material 220 (e.g., as PIP) for co-display with principal material 210.

At block 550, the first device assigns portions of the datagram to portions of the transmission spectrum. For example, the first device assigns a first portion of a video stream 170 received at X MHz to A meters and a second portion received at Y MHz to B meters when switching from radio communications spectra to fiber optic communications spectra. In another example, the first device assigns a first portion of a video stream 170 received at X MHz to Y MHz and a second portion received at Y MHz to X MHz when substituting the first and second portions. The first device includes any supplemental material 220 identified for inclusion in the one or more supplemental portions of the spectrum used for OOB communication with the destination device. The supplemental portions of the spectrum may be disjoint from the primary portions of the spectrum (e.g., a bandgap may exist between in-band and OOB frequencies).

At block 560, the first device transmits the content as-modified to the second device according to the standard selected for communication between the first device and the second device. Method 500 may then return to block 510 to handle the content for a next transmission window.

In the present disclosure, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to an entity on a pay-per-use basis, where entities are charged only for the computing resources actually used (e.g. an amount of storage space consumed by an entity or a number of virtualized systems instantiated by the entity). An entity can access any of the resources that reside in the cloud at any time, and from anywhere across the Internet. In context of the present invention, an entity may access applications or related data (e.g., underlying content) available in a storage provider 160 distributed across the cloud. For example, various underlying content referenced in the supplemental material 220 may be present on one or more computing systems distributed across the cloud. Doing so allows an entity to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
  receiving, at a first device an annotated video stream from a second device, wherein the annotated video stream includes a principal material in a principal spectrum and a supplemental material in a supplemental spectrum, wherein the principal spectrum is in-band for a display device and the supplemental spectrum is out-of-band for the display device; and
  in response to receiving, from the first device, an indication that the principal material is secondary content and that the supplemental material is primary content:
    repackaging the annotated video stream to include the supplemental material in the principal spectrum.

2. The method of claim 1, further comprising:
  retransmitting the re-packaged annotated video stream with the supplemental material as a new principal material in the principal spectrum for a third device.

3. The method of claim 1, wherein the first device is the display device, wherein repackaging the annotated video stream to include the supplemental material in the principal spectrum reformats the annotated video stream to output the supplemental material for display on the display device.

4. The method of claim 1, wherein the supplemental material is metadata that provides a link to underlying content stored in a cloud storage provider, wherein repackaging the annotated video stream to include the supplemental material in the principal spectrum further comprises:
  receiving the underlying content from the cloud storage provider; and
  including the underlying content in the annotated video stream in the principal spectrum.

5. The method of claim 1, wherein repackaging the annotated video stream to include the supplemental material in the principal spectrum further comprises:
  repackaging the annotated video stream to include the principal material in the supplemental spectrum.

6. The method of claim 1, wherein repackaging the annotated video stream to include the supplemental material in the principal spectrum further comprises:
  inserting the supplemental material and the principal material into a shared video frame.

7. The method of claim 1, wherein repackaging the annotated video stream to include the supplemental material in the principal spectrum further comprises:
  removing a segment of the principal material from the annotated video stream; and
  substituting a segment of the supplemental material into the annotated video stream where the segment of the principal material was removed in the principal spectrum.

8. The method of claim 1, wherein repackaging the annotated video stream to include the supplemental material in the principal spectrum further comprises:
  splicing the supplemental material into the annotated video stream in the principal spectrum at an end of a segment of the principal material.

9. The method of claim 1, wherein the indication is based on regional tags annotating the annotated stream corresponding to a geographic region of the first device or a user command.

10. The method of claim 1, wherein the principal material includes at least one of:
a news program;
a sports program;
a television program; or
a movie; and
wherein the supplemental material includes at least one of:
a script for the principal material;
metadata for the principal material;
cut portions of the principal material;
alternative camera angles for the principal material; or
graphics produced for the principal material.

11. The method of claim 1, wherein repackaging the annotated video stream to include the supplemental material in the principal spectrum further comprises inserting the supplemental material in real-time with transmission to the display device.

12. The method of claim 1, wherein the supplemental spectrum that is out-of-band for the display device occupies less bandwidth than the principal spectrum.

13. A non-transitory computer readable medium including instructions that are executable by a processor to perform an operation, the operation comprising:
receiving, at a first device an annotated video stream from a second device, wherein the annotated video stream includes a principal material in a principal spectrum and a supplemental material in a supplemental spectrum, wherein the principal spectrum is in-band for a display device and the supplemental spectrum is out-of-band for the display device; and
in response to receiving, from the first device, an indication that the principal material is secondary content and that the supplemental material is primary content:
repackaging the annotated video stream to include the supplemental material in the principal spectrum.

14. The computer readable medium of claim 13, wherein the first device is the display device, wherein repackaging the annotated video stream to include the supplemental material in the principal spectrum reformats the annotated video stream to output the supplemental material for display on the display device.

15. The computer readable medium of claim 13, wherein the supplemental material is metadata that provides a link to underlying content stored in a cloud storage provider, wherein repackaging the annotated video stream to include the supplemental material in the principal spectrum further comprises:

receiving the underlying content from the cloud storage provider; and
inserting the underlying content into the principal spectrum.

16. The computer readable medium of claim 13, wherein repackaging the annotated video stream to include the supplemental material in the principal spectrum further comprises:
repackaging the annotated video stream to include the principal material in the supplemental spectrum.

17. The computer readable medium of claim 13, wherein repackaging the annotated video stream to include the supplemental material in the principal spectrum further comprises:
removing a segment of the principal material from the annotated video stream; and
substituting a segment of the supplemental material into the annotated video stream where the segment of the principal material was removed in the principal spectrum.

18. The computer readable medium of claim 13, wherein repackaging the annotated video stream to include the supplemental material in the principal spectrum further comprises:
splicing the supplemental material into the annotated video stream in the principal spectrum at an end of a segment of the principal material.

19. The computer readable medium of claim 18, wherein splicing the supplemental material into the annotated video stream in the principal spectrum at an end of a segment of the principal material further comprises:
time shifting a second segment of the principal material in the annotated video stream to begin after the supplemental material concludes rather than after the segment of the principal material concludes.

20. A device, comprising:
a processor; and
a memory, including instructions that when executed by the processor enable the device to:
receiving, from an upstream device to the device, an annotated video stream that includes a principal material in a principal spectrum and a supplemental material in a supplemental spectrum, wherein the principal spectrum is in-band for a display device and the supplemental spectrum is out-of-band for the display device; and
in response to receiving an indication that the principal material is secondary content and that the supplemental material is primary content:
repackaging the annotated video stream to include the supplemental material in the principal spectrum.

* * * * *